United States Patent
Hon et al.

(10) Patent No.: US 9,298,913 B2
(45) Date of Patent: Mar. 29, 2016

(54) METHOD OF DETECTING INTRUSION BASED ON IMPROVED SUPPORT VECTOR MACHINE

(71) Applicant: Macau University of Science and Technology, Taipa (MO)

(72) Inventors: Chi Tin Hon, Taipa (MO); Jia Hua Xu, Taipa (MO)

(73) Assignee: Macau University of Science and Technology, Macau (CN)

( * ) Notice: Subject to any disclaimer, the term of this patent is extended or adjusted under 35 U.S.C. 154(b) by 20 days.

(21) Appl. No.: 14/201,939

(22) Filed: Mar. 10, 2014

(65) Prior Publication Data
US 2015/0135318 A1     May 14, 2015

(30) Foreign Application Priority Data

Nov. 12, 2013   (AU) ................................. 2013101474

(51) Int. Cl.
| G06F 9/00 | (2006.01) |
| G06F 21/55 | (2013.01) |
| H04L 29/06 | (2006.01) |

(52) U.S. Cl.
CPC .............. *G06F 21/55* (2013.01); *G06F 21/554* (2013.01); *H04L 63/1408* (2013.01); *H04L 63/1425* (2013.01); *G06F 2221/034* (2013.01)

(58) Field of Classification Search
CPC .................................................. H04L 63/0227
USPC ..................................................... 726/13, 14
See application file for complete search history.

(56) References Cited

U.S. PATENT DOCUMENTS

| 2005/0060295 A1* | 3/2005 | Gould et al. ...................... 707/3 |
| 2008/0247331 A1* | 10/2008 | Becker et al. ................. 370/253 |
| 2012/0016657 A1* | 1/2012 | He et al. ........................... 704/2 |

OTHER PUBLICATIONS

Vladimir N. Vapnik, Statistical Learning Theory, 1998, John Wiley & Sons, Inc., USA.
K.-R. Muller et al., "Predicting time series with support vector machines", Artificial Neural Networks—ICANN'97, 1997, p. 999-1004.
Thoesten Joachims, "Text categorization with support vector machines: Learning with many relevant features" Machine Learning: ECML-98, Lecture Notes in Computer Science vol. 1398, 1998, pp. 137-142.

\* cited by examiner

*Primary Examiner* — Christopher Brown
(74) *Attorney, Agent, or Firm* — Eagle IP Limited; Jacqueline C. Lui

(57) ABSTRACT

A method of detecting network intrusion based on improved support vector machine is disclosed. The method comprises the steps of identifying a plurality of features; computing information gain of each of the features; selecting a pre-determined number of features based on the computed information gain and augmenting that set of pre-determined number of features with special features to form a set of selected features; and classifying a network connection based on the selected features using support vector machine. In order to achieve better detection accuracy, cross-validation and grid-search are applied to select the radial basis function for the support vector machine.

6 Claims, 2 Drawing Sheets

METHOD OF DETECTING INTRUSION BASED ON IMPROVED SUPPORT VECTOR MACHINE

CROSS-REFERENCE TO RELATED APPLICATION

The present application claims priority under 35 U.S.C. §119 to Australian Patent Application No. 2013-101474 filed on Nov. 12, 2013. The content of the application is incorporated herein by reference in its entirety.

FIELD OF INVENTION

This invention relates to a method of detection intrusion based on improved support vector machine.

BACKGROUND OF INVENTION

With the development of internet, numbers of the internet attacks has increased substantially. Internet attacks can mainly be classified into four major categories: (1) denial-of-service (DOS), e.g. Synchronize (SYN) flood; (2) unauthorized access from a remote machine (Remote-to-Local (R2L), e.g. guessing password; (3) unauthorized access to local super user (root) privileges (User-to-Root (U2R)), e.g. various "buffer overflow" attacks and (4) probing.

In order to detect the aforesaid intrusion activity, different approaches have been proposed. Shuyuan Jin proposed two statistical supervised learning approaches: a proposed threshold based detection approach and a traditional decision tree approach in covariance feature space. Wei Wang uses the Principal Component Analysis to reduce the dimensionality of the data vectors and identification is handled in a low dimensional space with high efficiency and low use of system resources. The normal behavior is profiled based on normal data for anomaly detection and models of each type of attack are built based on attack data for intrusion identification. These approaches usually perform better in the aspect of detecting DOS and probing when comparing with detecting R2L and U2R.

SUMMARY OF INVENTION

In the light of the foregoing background, it is an object of the present invention to provide an alternate intrusion detection algorithm which is based on improved support vector machine.

Accordingly, the present invention, in one aspect, is a method of detecting intrusion comprising the steps of identifying a plurality of features; computing information gain of each of the features; selecting a pre-determined number of features based on the computed information gain and augmenting that set of pre-determined number of features with special features to form a set of selected features; and classifying a network connection based on the set of selected features using support vector machine.

In one embodiment, the features are selected from a group of features consisting of basic features of a Transport Control Protocol (TCP) connection, content features within a connection suggested by domain knowledge and traffic features computed using a two-second time window.

In an exemplary embodiment of the present invention, the method of detecting intrusion further comprises a step of normalizing and standardizing the features.

In another exemplary embodiment, the method of detecting intrusion further comprises a step of optimizing a radial basis function for the support vector machine In a further embodiment, the optimizing step further comprises a step of dividing a training set into a plurality of subsets with equal size and iterative steps of selecting one of the subset as test data; training the support vector machine based on the remaining subsets; and evaluating the trained support vector machine based on the test data. These iterative steps terminate when all of the subsets have been selected as test data and used to test the support vector machine.

In another embodiment, grid search is applied on the result obtained using the above mentioned iterative steps so as to select the result that yield the highest accuracy of the support vector machine.

The major advantage of the present invention is that it has a very high sensitivity in detecting U2R and R2L. This is going to be more and more important for real-life application as more and more new attacks, such as My Structured Query Language (SQL) injection and Cross-site Scripting (XSS), have been identified as U2R attacks.

BRIEF DESCRIPTION OF FIGURES

FIG. 2 illustrates the iterative step of cross-validation according to one embodiment of the present invention.

DETAILED DESCRIPTION OF THE PREFERRED EMBODIMENTS

As used herein and in the claims, "comprising" means including the following elements but not excluding others.

Figure 1:
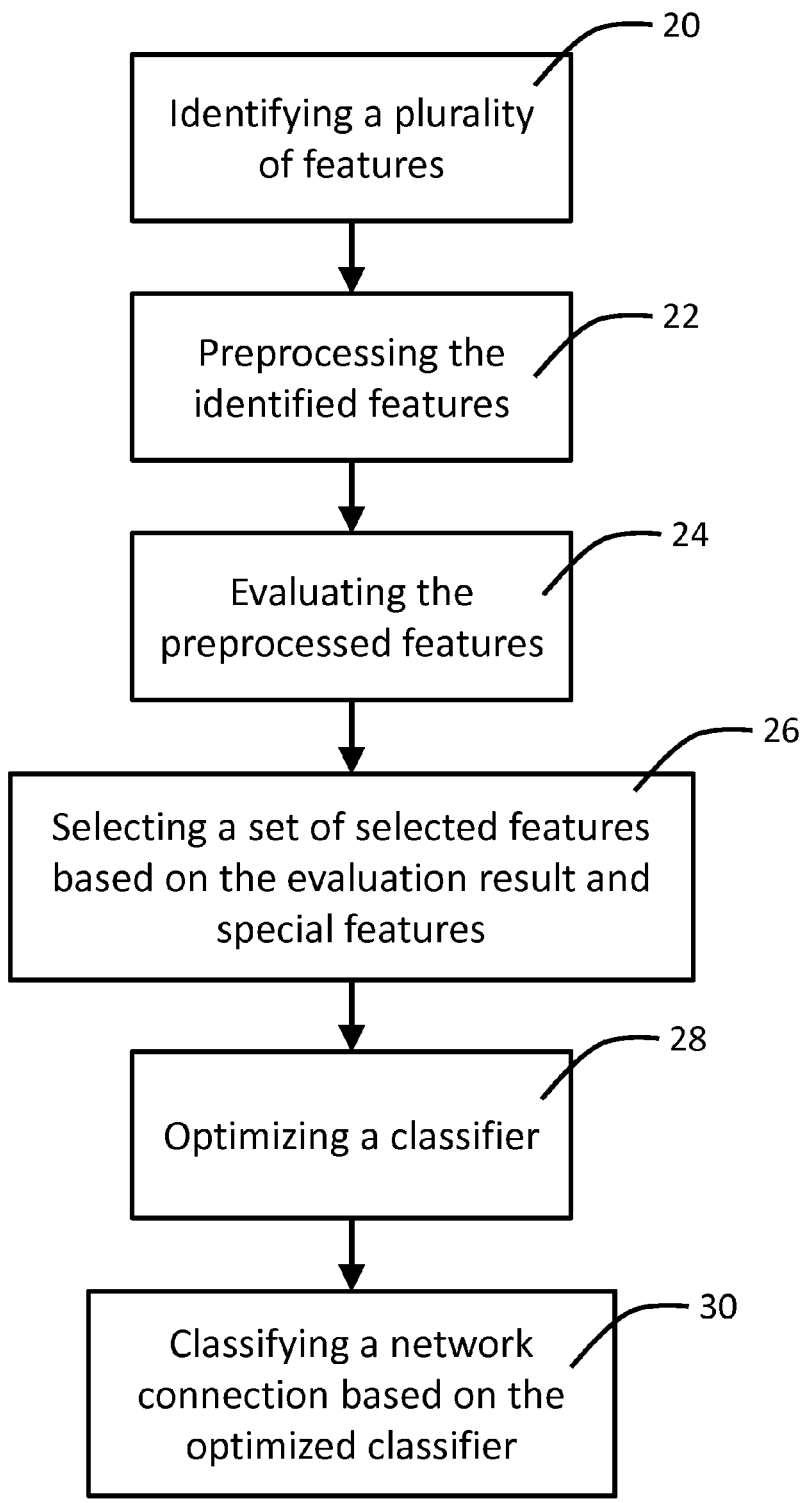
FIG. 1 is the flow chart of the intrusion detection algorithm according to one embodiment of the present invention.

Referring now to FIG. 1, the first aspect of the present invention is a method of detecting internet intrusion based on an improved support vector machine. In one embodiment, the method comprises the steps of identifying a plurality of features (step 20); evaluating the features (step 24); selecting a pre-determined number of features based on the evaluation result and augmented this set with special features (step 26) to form a set of selected features; and classifying a network connection based on the set of selected features using a classifier (step 30). In another embodiment, the plurality of features are selected from a group of features consisting of basic features of a TCP connection, content features within a connection suggested by a domain knowledge and traffic features computed using a two-second time window. In one embodiment, the special features refer to particular features playing an important role in a particular kind of internet intrusion.

In yet another embodiment, the method further comprises a step of preprocessing the identified features (step 22). In one specific embodiment, step 22 further comprises the steps of normalizing and standardizing the plurality of features. In a further embodiment, the evaluation of the features (step 24) is based on the information gain of each of the features.

Figure 2A:
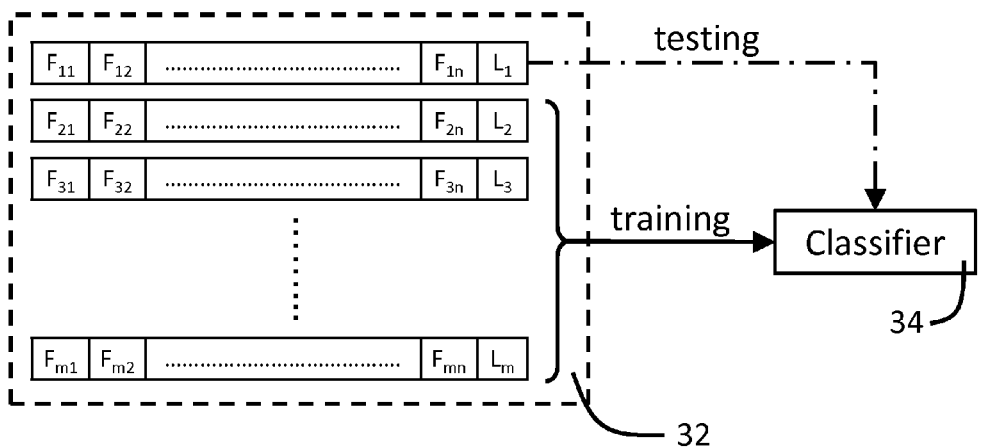
FIG. 2a illustrates the first iterative step of using the first subset as the testing data.
Figure 2B:
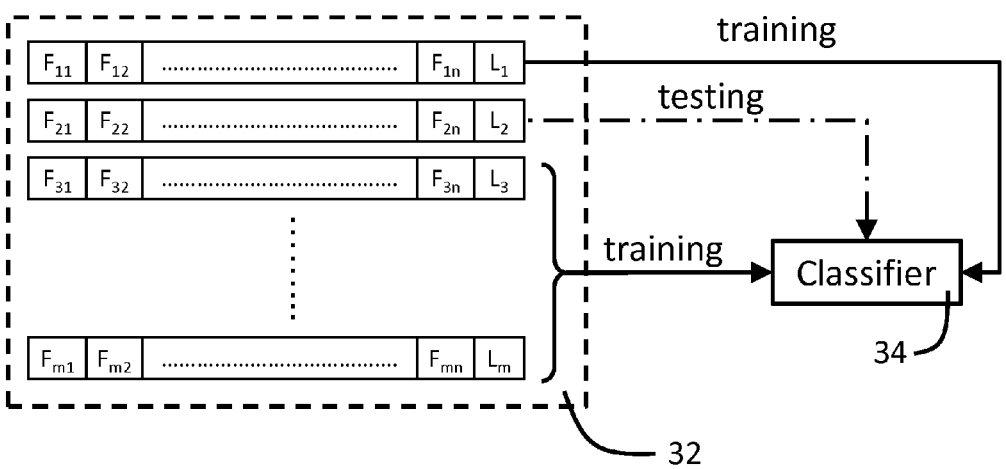
FIG. 2b illustrates the second iterative step of using the second subset as the testing data.

In another embodiment of the present invention, the method further comprises a step of optimizing the classifier (step 28). In one embodiment, the classifier is support vector machine and step 28 further comprises a step of optimizing the parameters of a radial basis function for the support vector machine. In a further embodiment, the optimization of the radial basis function is based on cross-validation and grid search. FIG. 2 illustrates the methodology of the cross-validation. First of all, the training set 32 is divided into a plurality of subset with equal size. In this specific example, the training set 32 is divided into m subsets. Each subset represents a connection with n features and a label. For instance, the first connection has n features of $F_{11}, F_{12}, \ldots, F_{1n}$ and a label of $L_1$. The label indicates what category of intrusion type this feature record belongs to. To perform the cross-validation, the first subset is first selected as a test data (as shown in FIG. 2a). The classifier 34 is then trained based on the remaining subsets. Afterward the classifier 34 is evaluated using the first subset. The above steps will iterate with another subset selected as the test data (for instance the second subset is selected as the test data in FIG. 2b) until all subsets have been selected as test data and used to evaluate the classifier 34. After the competition of the cross-validation, a grid search is performed on the evaluation result of the cross-validation in order to achieve the best accuracy of the classifier 34.

To better illustrate the methodology of the present invention, an example of applying the above methodology on the Knowledge Discovery in Databases (KDD) is given. KDD is a database provided by the 1998 DARPA Intrusion Detection Evaluation Program (DARPA is the acronym for Defense Advanced Research Projects Agency). It was prepared and managed by Massachusetts Institute of Technology (MIT) Lincoln Labs. The objective is to survey and to evaluate research in intrusion detection. A standard set of data to be audited, which includes a wide variety of intrusions simulated in a military network environment, was provided. The 1999 KDD intrusion detection contest uses a version of this dataset. The competition task was to build a network intrusion detector, a predictive model capable of distinguishing between "bad" connections, called intrusions or attacks and "good" normal connections. This database contains a standard set of data to be audited, which includes a wide variety of intrusions simulated in a military network environment.

The KDD dataset consists of four major categories: (1) denial-of-service (DOS), e.g. SYN flood; (2) unauthorized access from a remote machine (R2L), e.g. guessing password; (3) unauthorized access to local super user (root) privileges (U2R), e.g. various "buffer overflow" attacks and (4) probing, e.g. surveillance and port scanning. Each labeled record consisted of 41 and one target value (i.e. the label). Target value indicated the attack category name There are around 10 percent of 5 million (4,898,430) records in the labeled dataset, and unlabeled attacks fall into the aforesaid four categories.

In this illustrative example, three main groups of features are used in order to classify a particular network connection. These features are basic features of a TCP connection (as shown in table 1), content features within a connection suggested by a domain knowledge (as shown in table 2) and traffic features computed using a two-second time window (as shown in table 3).

TABLE 1

Basic features of a TCP connection

| Feature Name | Description | Type |
| --- | --- | --- |
| duration | length (number of seconds) of the connection | continuous |
| protocol_type | type of the protocol, e.g. tcp, udp, etc. | discrete |
| service | network service on the destination, e.g., http, telnet, etc. | discrete |
| src_bytes | number of data bytes from source to destination | continuous |
| dst_bytes | number of data bytes from destination to source | continuous |
| flag | normal or error status of the connection | discrete |
| land | 1 if connection is from/to the same host/port; 0 otherwise | discrete |

TABLE 1-continued

Basic features of a TCP connection

| Feature Name | Description | Type |
| --- | --- | --- |
| wrong_fragment | number of "wrong" fragments | continuous |
| urgent | number of urgent packets | continuous |

TABLE 2

Content features within a connection suggested by a domain knowledge

| Feature Name | Description | Type |
| --- | --- | --- |
| hot | number of "hot" indicators | continuous |
| num_failed_logins | number of failed login attempts | continuous |
| logged_in | 1 if successfully logged in; 0 otherwise | discrete |
| num_compromised | number of "compromised" conditions | continuous |
| root_shell | 1 if root shell is obtained; 0 otherwise | discrete |
| su_attempted | 1 if "su root" command attempted; 0 otherwise | discrete |
| num_root | number of "root" accesses | continuous |
| num_file_creations | number of file creation operations | continuous |
| num_shells | number of shell prompts | continuous |
| num_shells | number of shell prompts | continuous |
| num_access_files | number of operations on access control files | continuous |
| num_outbound_cmds | number of outbound commands in an ftp session | continuous |
| is_hot_login | 1 if the login belongs to the "hot" list; 0 otherwise | discrete |

TABLE 3

Traffic features computed using a two-second time window

| Feature Name | Description | Type |
| --- | --- | --- |
| count | number of connections to the same host as the current connection in the past two seconds | continuous |
| serror_rate | % of connections that have "SYN" errors | continuous |
| rerror_rate | % of connections that have "REJ" errors | continuous |
| same_srv_rate | % of connections to the same service | continuous |
| diff_srv_rate | % of connections to different services | continuous |
| srv_count | number of connections to the same service as the current connection in the past two seconds | continuous |
| srv_serror_rate | % of connections that have "SYN" errors | continuous |
| srv_rerror_rate | % of connections that have "REJ" errors | continuous |
| srv_diff_host_rate | % of connections to different hosts | continuous |

It should be noticed that different features have different ranges. Some of the feature may even have a maximum value of less than 1. On the other hand, some features have non-numerical values, for instance "protocol" can be "tcp", "udp" and "icmp". Furthermore, some feature, for instance log_in (1 if successfully logged in; 0 otherwise), are the Boolean values. In order to deal with this variety, pre-processing of the features is required. In this example, the protocol type, flag and service are first normalized (i.e. assigning a numerical value to a discrete, non-numerical state that this feature can assume). Tables 4 to 6 below indicate the feature values after the normalization process.

TABLE 4

Normalization of protocol type

| Protocol_type | |
| --- | --- |
| tcp | 1 |
| udp | 2 |
| icmp | 3 |

TABLE 5

Normalization of flag

| Flag | |
| --- | --- |
| SF | 1 |
| S1 | 2 |
| REJ | 3 |
| S2 | 4 |
| S0 | 5 |
| S3 | 6 |
| RSTO | 7 |
| RSTR | 8 |
| RSTOS0 | 9 |
| OTH | 10 |
| SH | 11 |

TABLE 6

Normalization of service

| Flag | |
| --- | --- |
| http | 1 |
| pm | 2 |
| _dump | 3 |
| Icmp | 4 |
| ... | ... |
| ... | ... |
| ... | ... |
| Netstat | 65 |
| X11 | 66 |

After proper normalization, equation (1) is employed in order to standardized a feature x in the range of [0,1]. In equation (1), $x_{max}$ and $x_{min}$ refer to the maximum and minimum value of that particular series of features.

$$x = (x - x_{min})/(x_{max} - x_{min}) \quad (1)$$

After normalization and standardization of all the features, the significance of each feature is measured by the information gain. In this example, information gain evaluator is used as the ranker model. Table 7 indicates the order of the features selected by the ranker model regarding the KDD database.

TABLE 7

Order of features selected by the gain ratio evaluator

| Order | Features |
| --- | --- |
| 1 | count |
| 2 | service |
| 3 | src_bytes |
| 4 | srv_count |
| 5 | dst_host_same_src_port_rate |
| 6 | protocol_type |
| 7 | dst_host_srv_count |
| 8 | dst_host_diff_srv_rate |
| 9 | dst_host_same_srv_rate |
| 10 | diff_srv_rate |
| 11 | same_srv_rate |

TABLE 7-continued

Order of features selected by the gain ratio evaluator

| Order | Features |
| --- | --- |
| 12 | flag |
| 13 | dst_bytes |
| 14 | dst_host_serror_rate |
| 15 | serror_rate |
| 16 | dst_host_srv_serror_rate |
| 17 | srv_serror_rate |
| 18 | logged_in |
| 19 | dst_host_count |
| 20 | dst_host_srv_diff_host_rate |
| 21 | Srv_diff_host_rate |
| 22 | dst_host_rerror_rate |
| 23 | dst_host_srv_rerror_rate |
| 24 | rerror_rate |
| 25 | srv_rerror_rate |
| 26 | duration |
| 27 | hot |
| 28 | num_compromised |
| 29 | wrong_fragment |
| 30 | is_guest_login |
| 31 | num_root |
| 32 | num_access_files |
| 33 | num_file_creations |
| 34 | num_failed_logins |
| 35 | root_shell |
| 36 | land |
| 37 | num_shells |
| 38 | urgent |
| 39 | su_attempted |
| 40 | num_outbound_cmds |
| 41 | is_host_login |

In order to reduce the computational demand of the detection algorithm, only a subset of the feature will be selected. In this example, only 12 features will be selected. Apart from the order shown in table 7, the role of a particular feature in a particular intrusion is also taken into the consideration during the selection. In order to enhance the sensitivity of the present invention towards detecting U2R and R2L, the two features "is_guest_login" and "root_shell" are specifically selected as the attack data packages of U2R and R2L usually acts like the normal data packages and most of these attacks are embedded into data load in the data package. As a result, the following twelve features: "service", "dst_host_srv_count", "count", "srv_count", "logged_in", "dst_host_count", "dst_host_diff_srv_rate", "dst_host_srv_diff_host_rate", "dst_host_same_srv_rate", "dst_host_same_src_port_rate", "is_guest_login" and "root_shell" are selected in this specific example. It should be appreciated that those skilled in the art can, based on the teaching of this invention, use similar criteria to choose different set of features for tackling different kinds of intrusion detection problems.

In this example, support vector machine is used as the classifier. The accuracy of a support vector machine is greatly depended on the radial basis function (RBF) used. Radial basis function has two important parameters (c, γ), where c is the tradeoff parameter and γ is the width of the RBF. In order to identify a good (c, γ), cross-validation is first applied to a training set of data. It should be noted that identifying a good (c, γ) will improve the accuracy of the classifier, but not necessarily be useful to achieve high training accuracy.

After the completion of cross-validation, a series of (c, γ) is obtained. Grid-search is then applied to pick the (c, γ) with the best cross-validation. The main advantage of using gird search methods is to avoid doing an exhaustive parameter search by approximations or heuristics. The other advantage is that the computational time required to find good parameters by grid search is not much more than that by advanced methods since there are only two parameters. Furthermore, the grid-search can be easily parallelized because each (c, γ) is independent. In this example with KDD database, (c, γ) equals to (0.99999, 0.125555) yields the best result in our experiments.

The support vector machine with RBF being (0.99999, 0.125555) is then applied to classify network connections with the above identified twelve features. The classification result of the algorithm in this example is shown in table 8. The performance of the present invention is also compared with other algorithms, such as basis net, native basis, Sequential Minimal Optimization (SMO), random tree, J48 and Bloom Filter (BF) tree, etc. The comparison is shown in table 9. It should be noted that the methodology as taught by the present invention outperforms other algorithms on the attack types of U2R and R2L, especially U2R.

TABLE 8

Classification result of the present invention with RBF: (0.99999, 0.125555)

| | | Predication | | | | | |
|---|---|---|---|---|---|---|---|
| | | Normal | Probe | Dos | U2R | R2L | Accuracy |
| Actual | Normal | 59173 | 465 | 674 | 123 | 156 | 97.60% |
| | Probe | 187 | 3090 | 224 | 140 | 525 | 74.10% |
| | Dos | 7278 | 534 | 221036 | 349 | 656 | 96.10% |
| | U2R | 12 | 0 | 0 | 210 | 6 | 92.10% |
| | R2L | 14001 | 17 | 16 | 148 | 2007 | 12.10% |

TABLE 9

Accuracy comparison of present invention with other algorithms

| | Probe | Dos | U2R | R2L |
|---|---|---|---|---|
| Present Invention | 74.10% | 96.10% | 92.10% | 12.10% |
| Kdd winner | 83.30% | 97.10% | 13.20% | 8.40% |
| Native basis | 75.70% | 90.50% | 72.80% | 10.66% |
| Basis net | 75.50% | 94.80% | 14.90% | 11.60% |
| liblinear | 73.09% | 82% | 17.90% | 7.20% |
| logistics | 74.96% | 96.10% | 73.20% | 9.30% |
| SMO | 73.09% | 92.02% | 89.90% | 8.65% |
| DNTB | 73.74% | 96.02% | 35.51% | 8.90% |
| jRIP | 72.87% | 96.28% | 11.40% | 9.60% |
| OneR | 83.90% | 71.90% | 17.50% | 10% |
| PART | 77.70% | 96.10% | 67.10% | 8.60% |
| Radom forest | 75.20% | 96.30% | 66.22% | 11.59% |
| Random tree | 79.60% | 96.10% | 13.50% | 11.40% |
| J48 | 80.46% | 96.20% | 79.10% | 8.55% |
| Bf tree | 73.95% | 83.78% | 14.79% | 10.20% |
| REP tree | 79.60% | 96.10% | 13.50% | 11.40% |

It is understood that the present invention can be realized in hardware, software, or a combination of hardware and software. Any kind of mobile device/computer/server system(s)—or other apparatus adapted for carrying out the methods described herein—is suited. A typical combination of hardware and software could be a general purpose computer system with a computer program that, when loaded and executed, controls monitoring and detection system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The monitoring and detection system generally comprises central processing unit (CPU), memory, and input/output (I/O) interfaces. Memory may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

What is claimed is:

1. A method executed by a server to determine a type of computer intrusion, the method comprising:
   a) identifying, by the server, a plurality of features;
   b) computing, by the server, information gain of each of said plurality of features;
   c) selecting, by the server, a pre-determined number of features from said plurality of features based on said information gain and augmenting said pre-determined number of features with special features to form a set of selected features; and
   d) classifying, by the server, the type of computer intrusion based on said set of selected features using support vector machine;
   wherein said plurality of features are selected from a group of features consisting of basic features of a TCP connection, content features within a connection suggested by a domain knowledge and traffic features computed using a two-second time window.

2. The method of claim 1 further comprising: normalizing and standardizing, by the server, said plurality of features.

3. The method of claim 1, wherein said special features comprise a first feature identifying whether a login is from a guest and a second feature regarding root shell.

4. The method of claim 1 further comprising: optimizing, by the server, a radial basis function for said support vector machine, wherein said optimizing said radial basis function further comprises dividing a training set into a plurality of subsets with equal size and iterative steps of:
   e) selecting, by the server, one of said plurality of subsets as test data;
   f) training, by the server, said support vector machine based on said plurality of subsets excluding said test data; and
   g) evaluating, by the server, said trained support vector machine based on said test data;
   wherein said iterative steps terminate when all of said plurality of subsets has been selected as test data and tested.

5. The method of claim 4 further comprising: performing, by the server, a grid search on results obtained using said iterative steps.

6. The method of claim 1 further comprising:
   e) identifying, by the server, the computer intrusion to be one of denial of service (DOS), unauthorized access from a remote machine (R2L), unauthorized access to a local super user (root) privileges, and probing.

* * * * *